(12) United States Patent
Conklin

(10) Patent No.: US 7,978,765 B2
(45) Date of Patent: Jul. 12, 2011

(54) CONTEXT-ADAPTIVE MACROBLOCK TYPE ENCODING/DECODING METHODS AND APPARATUSES

(75) Inventor: Gregory J. Conklin, Seattle, WA (US)

(73) Assignee: RealNetworks, Inc., Seattle, WA (US)

( * ) Notice: Subject to any disclaimer, the term of this patent is extended or adjusted under 35 U.S.C. 154(b) by 1482 days.

(21) Appl. No.: 10/508,597

(22) PCT Filed: Mar. 12, 2003

(86) PCT No.: PCT/US03/07882
§ 371 (c)(1),
(2), (4) Date: Sep. 21, 2004

(87) PCT Pub. No.: WO03/084241
PCT Pub. Date: Oct. 9, 2003

(65) Prior Publication Data
US 2005/0147160 A1    Jul. 7, 2005

Related U.S. Application Data

(60) Provisional application No. 60/366,835, filed on Mar. 22, 2002.

(51) Int. Cl.
*H04N 7/12* (2006.01)
(52) U.S. Cl. .................................................. 375/240.03
(58) Field of Classification Search .............. 375/240.03
See application file for complete search history.

(56) References Cited

U.S. PATENT DOCUMENTS

| | | | | |
|---|---|---|---|---|
| 5,400,075 A | * | 3/1995 | Savatier | 375/240.23 |
| 5,428,396 A | * | 6/1995 | Yagasaki et al. | 375/240.16 |
| 5,493,513 A | * | 2/1996 | Keith et al. | 709/247 |
| 5,835,144 A | * | 11/1998 | Matsumura et al. | 375/240.23 |
| 5,859,932 A | * | 1/1999 | Etoh | 382/253 |
| 5,867,221 A | * | 2/1999 | Pullen et al. | 375/240.16 |
| 6,198,768 B1 | * | 3/2001 | Yamaguchi et al. | 375/240.01 |
| 6,563,953 B2 | * | 5/2003 | Lin et al. | 382/233 |

(Continued)

FOREIGN PATENT DOCUMENTS

DE    101 43 063 A1    9/2002

(Continued)

OTHER PUBLICATIONS

ITU-T Series H: Audivisual and Multimedia Syatems Infrastructure of Audiovisual services—Coding of moving video, H.263, Feb. 1998.*

(Continued)

*Primary Examiner* — Tung Vo
*Assistant Examiner* — Anner Holder
(74) *Attorney, Agent, or Firm* — ÆON Law; Adam L. K. Philipp

(57) ABSTRACT

Macroblock types of macroblocks of a video picture are encoded by adaptively employing codewords of codeword tables, based at least in part on one or more macroblock type related characteristics of one or more neighboring macroblocks of interest. The codewords may be variable in length. The one or more macroblock type characteristics may include a most common macroblock type characteristic of the neighboring macroblocks of interest. The adaptive employment of the codeword tables may be further based on a picture type of the picture of which the macroblocks are members. Decoding may be performed in an inverse manner.

33 Claims, 7 Drawing Sheets

U.S. PATENT DOCUMENTS

| | | | |
|---|---|---|---|
| 6,856,701 B2* | 2/2005 | Karczewicz et al. | 382/247 |
| 6,907,142 B2* | 6/2005 | Kalevo et al. | 382/238 |
| 7,080,319 B1* | 7/2006 | Hernandez, III | 715/202 |
| 2001/0022855 A1 | 9/2001 | Matsumoto | |
| 2001/0043653 A1 | 11/2001 | Hosaka | |
| 2002/0054638 A1* | 5/2002 | Hanamura et al. | 375/240.03 |

FOREIGN PATENT DOCUMENTS

| | | |
|---|---|---|
| EP | 0 613 300 A2 | 8/1994 |
| WO | WO 00/33583 | 6/2000 |

OTHER PUBLICATIONS

ITU-T H.263 Series H: Audiovisual and Multimedia Systems Feb. 1998 (H.263 Series H).*

Wiegand, T., "Joint Model No. 1, Revision 1 (JM-IRL)" ITU Study Group 16—Video Coding Experts Group, Dec. 3, 2001, pp. 1-75, XP-001086627.

"Recommendation H.263: Video Coding for Low Bit Rate Communication," ITU-T Draft Recommendation H.263, Feb. 1998, pp. 1-167, XP-002176560.

* cited by examiner

CONTEXT-ADAPTIVE MACROBLOCK TYPE ENCODING/DECODING METHODS AND APPARATUSES

RELATED APPLICATION

This application is a non-provisional application of provisional application No. 60/366,835, filed Mar. 22, 2002, "Adaptive Macroblock Type Coding for Block Based Video Compression", which specification is hereby fully incorporated by reference.

FIELD OF THE INVENTION

The present invention relates to the field of video encoding/decoding. More specifically, the present invention is related to the encoding macroblock types of macroblocks of pictures of video, and decoding of the encodings.

BACKGROUND OF THE INVENTION

Advances in microprocessor and video related technologies have led to wide spread deployment and adoption of numerous types of video devices. Examples of such video devices include but are not limited to digital camcorders, digital versatile disk (DVD) players, video enabled laptop and desktop computing devices as well as servers, and so forth.

Advances in networking, telecommunication, satellite and other related technologies have also led to increase in on demand and/or real time online delivery of video, including delivery over public networks, such as the Internet.

Whether videos are delivered offline (e.g. from a DVD player) or online (e.g. from a video server), high quality video inherently requires a high volume of data. Thus, video delivery and rendering often involve encoding and decoding to reduce the amount of data to be stored, retrieved and/or transmitted.

Encoding/decoding of a video often involves processing the video as a stream of pictures. Each picture may be a field or a frame (typically consisting of two interleaved fields) comprising a number of macroblocks.

Each picture may be typed, e.g. an I-type, a P-type, or a B-type (also referred as I picture, P picture and B picture). An I picture is a picture coded using information only from itself. A P picture is a picture coded using motion compensated prediction from previously-decoded reference fields or frames, using at most one motion vector and reference picture to predict the value of each individual region. A B picture is a "predictive-coded" picture, where some macroblocks may use a weighted average of two distinct motion-compensated prediction values for the prediction of the macroblock sample values.

Each macroblock typically comprises tiles of pixels, e.g. tiles of 16×16 pixels. Further, each macroblock is typically typed, with the macroblock type indicating the specific method to encode (and therefore decode) this group of pixels, e.g. whether coding (and therefore decoding) is based on global motion, local motion, and so forth. Moreover, each macroblock type itself is typically coded into a codeword, along with coding of other aspects of the macroblock, e.g. its transform coefficients and so forth.

However, in the prior art, macroblock type is typically encoded in a static, i.e. non-adaptive, variable length encoding (VLC) manner. Experience has shown static VLC encoding of macroblock types of macroblocks of a picture may be inefficient, at least at times.

Thus, it will be desirable to encode and decode macroblock types of macroblocks of pictures of a video in a context-adaptive manner that is more effective, than the static non-adaptive techniques known to-date.

For further information on macroblock type, and prior art approaches to encoding macroblock type, see e.g. ITU-T Recommendation H.263 (ITU-T stands for International Telecommunication Union—Telecommunication Standardisation Sector).

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION OF EMBODIMENTS OF THE INVENTION

The present invention includes a context-adaptive macroblock type encoder, a complementary decoder, devices equipped with these encoders and/or decoders, systems made up of such devices, and methods of operations of these elements, devices and systems, and related subject matters.

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will be apparent to one skilled in the art that the present invention may be practiced without the specific details. In other instances, well-known features are omitted or simplified in order not to obscure the present invention.

Terminology

Parts of the description will be presented in video encoding and decoding terms consistent with the manner commonly employed by those skilled in the art to convey the substance of their work to others skilled in the art. These common video encoding and decoding terms are well understood by those skilled in the art. In particular, in a video device, these quantities may take the form of electrical, magnetic, or optical signals capable of being stored, transferred, combined, and otherwise manipulated through electrical and/or optical components of a processor, and its subsystems.

In various video encoding/decoding standards, encodings are organized in accordance with certain syntactical rules, thus they are also referred to as "syntax elements" at times.

Section Headings, Order of Descriptions and Embodiments

Section headings are merely employed to improve readability, and they are not to be construed to restrict or narrow the present invention.

Various operations will be described as multiple discrete steps in turn, in a manner that is helpful in understanding the present invention, however, the order of description should not be construed as to imply that these operations are necessarily order dependent. In particular, these operations need not be performed in the order of presentation.

The phrase "in one embodiment" is used repeatedly. The phrase generally does not refer to the same embodiment, however, it may. The terms "comprising", "having" and "including" are synonymous, unless the context dictates otherwise.

Encoder

Figure 1:
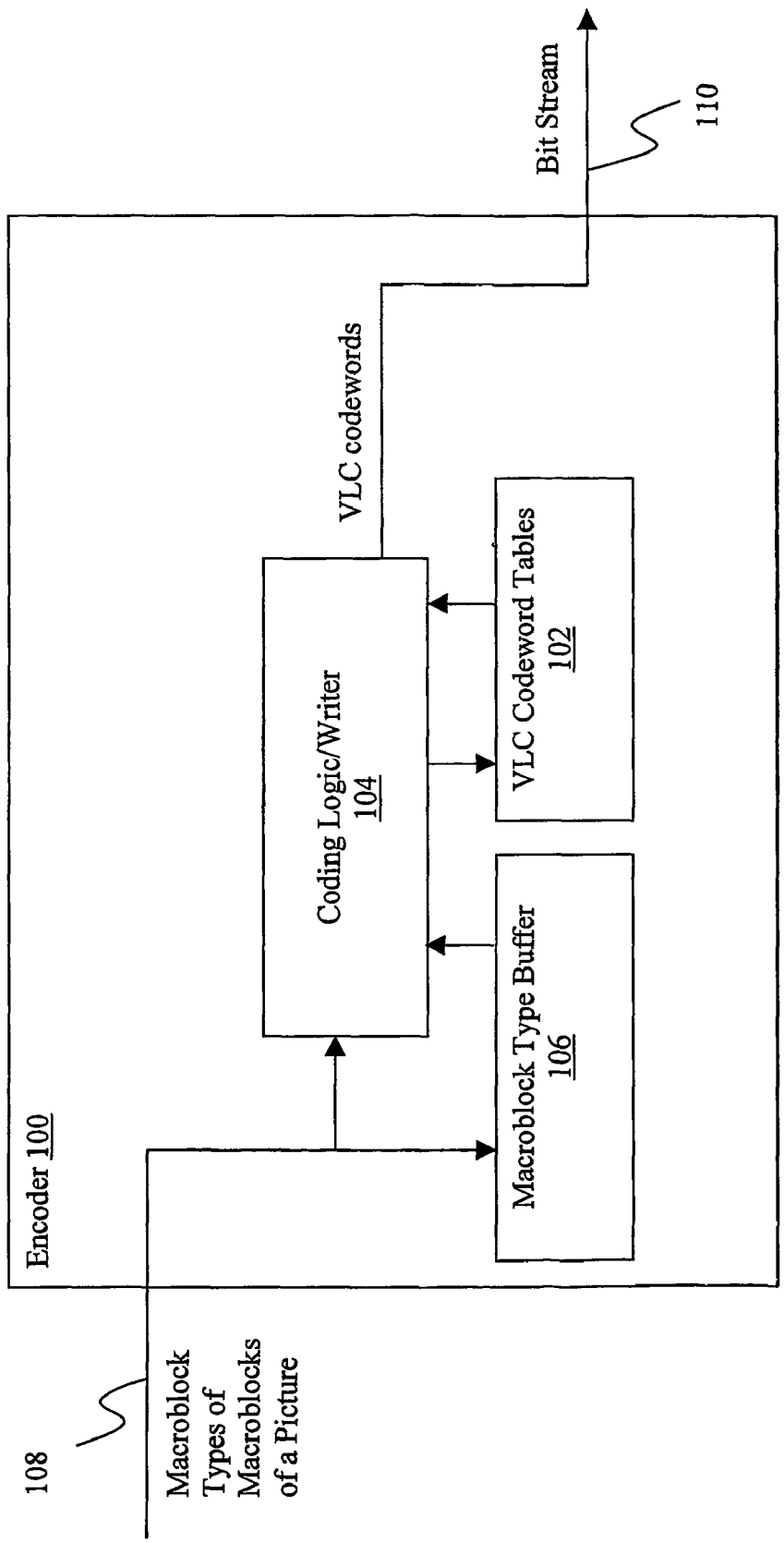
FIG. 1 illustrates an overview of a context-adaptive encoder of the present invention for encoding macroblock types of macroblocks of a picture, in accordance with one embodiment.

FIG. 1 illustrates an overview of a context-adaptive encoder of the present invention for encoding macroblock types of macroblocks of a picture, in accordance with one embodiment. As illustrated, for the embodiment, context-adaptive encoder 100 includes codeword tables 102, coding logic/writer 104, macroblock type buffer 106, coupled to each other and to input 108 as shown, to receive macroblock types of macroblocks of pictures of a video. Typically, the macroblock types are received in the form of a stream of binary data. In response, for each received macroblock type, coding logic/writer 104 using one or more macroblock type related characteristics of one or more macroblocks neighbor to the macroblock to select one of codeword tables 102, and encodes the macroblock type, in accordance with the selected one of codeword tables 102. Coding logic/writer 104 further outputs the codewords into a bit stream at output 110.

In other words, macroblock type buffer 106 is employed to store at least the macroblock types of the neighboring macroblocks of interest. In one embodiment, buffer 106 has sufficient capacity to store the macroblock types of all macroblocks of a picture, and for each macroblock type of a macroblock to be encoded, coding logic/writer 104 reads out only the macroblock types of the neighboring macroblocks of interest.

Figure 3A:
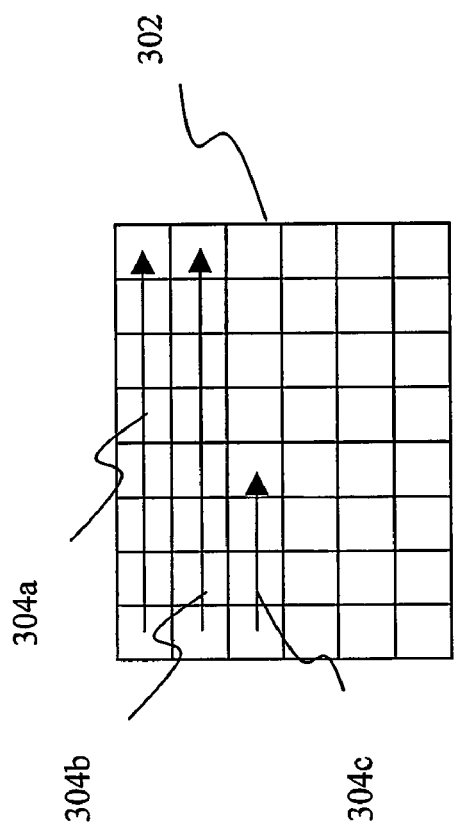
FIG. 3a illustrates processing of macroblocks of a picture, in accordance with one embodiment.

In various embodiments, the macroblocks of a picture are processed left-to-right, top-to-bottom, starting with the top leftmost macroblock, as depicted by arrows 304a-304c in FIG. 3a, superimposed on the macroblocks of an example picture 302.

Figure 3B:
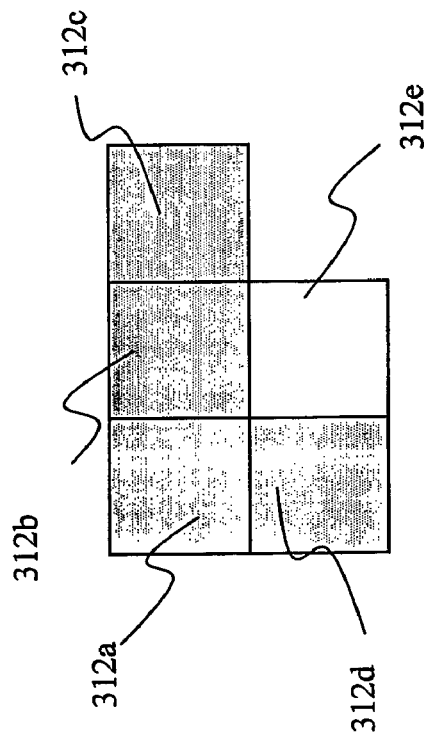
FIG. 3b illustrates the neighboring macroblocks which macroblock types are considered in the selection of a codeword table for use to encode the macroblock type of a macroblock, in accordance with one embodiment.

In various embodiments, as illustrated in FIG. 3b, the neighboring macroblocks 312a-312d which macroblock types are considered in the selection of a codeword table 102 to encode the macroblock type of a macroblock 312e of a picture comprises
 a) macroblock 312d immediately preceding macroblock 312e "at the same horizontal level", i.e. to the left of macroblock 312e, if present,
 b) macroblock 312b immediately "above" macroblock 312e vertically, if present,
 c) macroblock 312a immediately preceding macroblock 312b "at the same horizontal level", i.e. to the left of macroblock 312b, if preset, and
 d) macroblock 312c immediately following macroblock 312b "at the same horizontal level", i.e. to the right of macroblock 312b, if present.

In one words, for the embodiment, neighboring macroblocks which macroblock types are considered of interest include "preceding" macroblocks which are immediately adjacent to the macroblock which macroblock type is to be encoded, in both a horizontal and a vertical direction, as well as "preceding" macroblocks which are one degree removed from the macroblock, which macroblock type is to be encoded.

In alternate embodiments, more or less preceding neighboring macroblock's macroblock types may be considered.

Macroblocks 312a and 312d are "not present", when the current macroblock which macroblock type is to be encoded is located at the left edge of the picture. Similarly, macroblocks 312a-312c are "not present", when the current macroblock which macroblock type is to be encoded is located at the top edge of the picture.

In various embodiments, the selection of a codeword table 102 is based at least in part on a macroblock type characteristic of the neighboring macroblocks of interest. More specifically, in various embodiments, the selection of a codeword table 102 is based at least in part on the most common macroblock type of the neighboring macroblocks of interest. In alternate embodiments, one or more other characteristics in addition to or in lieu of the most common macroblock type of the neighboring macroblocks of interest may be employed in the selection of the codeword tables 104 instead.

Further, in various embodiments, the adaptive encoding of macroblock types of the present invention is practiced for pictures of certain picture type only. In various embodiments, it is practiced for P pictures and B pictures only.

Moreover, in various ones of these embodiments, the selection of a codeword table 102 is based at least in part on the picture type of the current picture which macroblocks' macroblock types are being encoded. In various embodiments, the picture type of a picture may be at least one of n picture types, n being an integer, and different sets of codeword tables are employed in the encoding of macroblock types of macroblocks of pictures of the different types. In various embodiments, n equals two.

The exact nature of the picture types is non-essential to the practice of the present invention. Accordingly, for ease of understanding, for the two picture type embodiments, the two picture types will simply be referred to as picture type I and picture type II.

In various embodiments, the macroblock type of a macroblock of a Type I picture may be one of m1 macroblock types. Accordingly, for the embodiments where the selection criteria comprises one attribute of the neighboring macroblocks of interest, such as the most common macroblock type, the set of codeword tables to be adaptively employed to encode macroblock types of macroblocks of a picture of Type I comprises m1 codeword tables, each having m1 codewords. In various embodiments, the codewords are VLC codewords, and m1 equal seven.

In various embodiments, the macroblock type of a macroblock of a Type II picture may be one of m2 macroblock types. Accordingly, for the embodiments where the selection criteria comprises one attribute of the neighboring macroblocks of interest, such as the most common macroblock type, the set of codeword tables to be adaptively employed to encode macroblock types of macroblocks of a picture of Type II comprises m2 codeword tables, each having m2 codewords. In various embodiments, the codewords are VLC codewords, and m2 equals six.

The exact meaning of each of the macroblock types of macroblocks of a picture of a particular type is also non-essential to the practice of the present invention. Accordingly, for ease of understanding, they shall simply be referred to as macroblock type A1 through macroblock type G1, in the case where there are seven macroblock types, and macroblock type A2 through F2, in the case where there are six macroblock types.

In one embodiment where the codeword table selection criteria comprises the most common macroblock type characteristic of the neighboring macroblocks of interest and there are seven possible macroblock types for the macroblocks of a picture, the codeword tables for encoding macroblock types of the macroblocks of the picture may be

| MB type | Table 1 MC = Type A1 | Table 2 MC = Type B1 | Table 3 MC = Type C1 | Table 4 MC = Type D1 |
|---|---|---|---|---|
| Type A1 | 1 | 001 | 01101 | 1001 |
| Type B1 | 01 | 1 | 0101 | 10001 |
| Type C1 | 001 | 01 | 1 | 01 |
| Type D1 | 000001 | 0000001 | 0100 | 00 |
| Type E1 | 00001 | 000001 | 001 | 101 |
| Type F1 | 0001 | 00001 | 000 | 11 |
| Type G1 | 0000001 | 0001 | 0111 | 100001 |

| MB Type | Table 5 MC = Type E1 | Table 6 MC = Type F1 | Table 7 MC = Type G1 |
|---|---|---|---|
| Type A1 | 00001 | 00001 | 000001 |
| Type B1 | 000001 | 000001 | 001 |
| Type C1 | 1 | 1 | 01 |
| Type D1 | 0001 | 0001 | 0000001 |
| Type E1 | 01 | 001 | 00001 |
| Type F1 | 001 | 01 | 0001 |
| Type G1 | 0000001 | 0000001 | 1 | where MC=Most Common Macroblock Type of the neighboring macroblocks of interest.

In one embodiment where the codeword table selection criteria comprises the most common macroblock type characteristic of the neighboring macroblocks of interest and there are six possible macroblock types for the macroblocks of a picture, the codeword tables for encoding macroblock types of the macroblocks of the picture may be

| MB Type | Table 1 MC = Type A2 | Table 2 MC = Type B2 | Table 3 MC = Type C2 |
|---|---|---|---|
| Type A2 | 01 | 0001 | 000001 |
| Type B2 | 101 | 1 | 0001 |
| Type C2 | 00 | 001 | 1 |
| Type D2 | 11 | 01 | 01 |
| Type E2 | 10001 | 000001 | 00001 |
| Type F2 | 1001 | 00001 | 001 |

| MB Type | Table 4 MC = Type D | Table 5 MC = Type E | Table 6 MC = Type F |
|---|---|---|---|
| Type A2 | 01001 | 000001 | 000001 |
| Type B2 | 001 | 00001 | 00001 |
| Type C2 | 000 | 001 | 001 |
| Type D2 | 1 | 01 | 1 |
| Type E2 | 0101 | 0001 | 0001 |
| Type F2 | 011 | 1 | 01 | where MC also equals "Most Common Macroblock Type" of the neighboring macroblocks of interest.

In various embodiments, where the selection process may end with a tie, such as embodiments employing the "most common macroblock type" among the neighboring macroblocks of interest as the selection criteria, one or more tie breaking rules may be employed to break a tie in the event two or more macroblock types have the same frequency of occurrence. In various embodiments, a tie breaking rule may be a precedence rule. In one embodiment, where the "most common macroblock type" among the neighboring macroblocks of interest is employed as the selection criteria, and the macroblock type may be one of seven macroblock types, the precedence rule may be

| Precedence | Macroblock Type |
|---|---|
| 1 | Type A |
| 2 | Type B |
| 3 | Type C |
| 4 | Type D |
| 5 | Type E |
| 6 | Type F |
| 7 | Type G | where precedence value 1 is highest and 7 is lowest.

In another similar embodiment, where there are six possible macroblock types, the precedence rule may be

| Precedence | Macroblock Types |
|---|---|
| 1 | Type F |
| 2 | Type E |
| 3 | Type D |
| 4 | Type C |
| 5 | Type B |
| 6 | Type A | where precedence value 1 is highest and 6 is lowest.

The above precedence rules are merely exemplary. They do not suggest that the precedence values of a precedence rule have to have either an ascending or a descending correlation with the manner the macroblock types is "labeled". The present invention includes all possible combinations of macroblock type labeling and precedence ordering.

Figure 2:
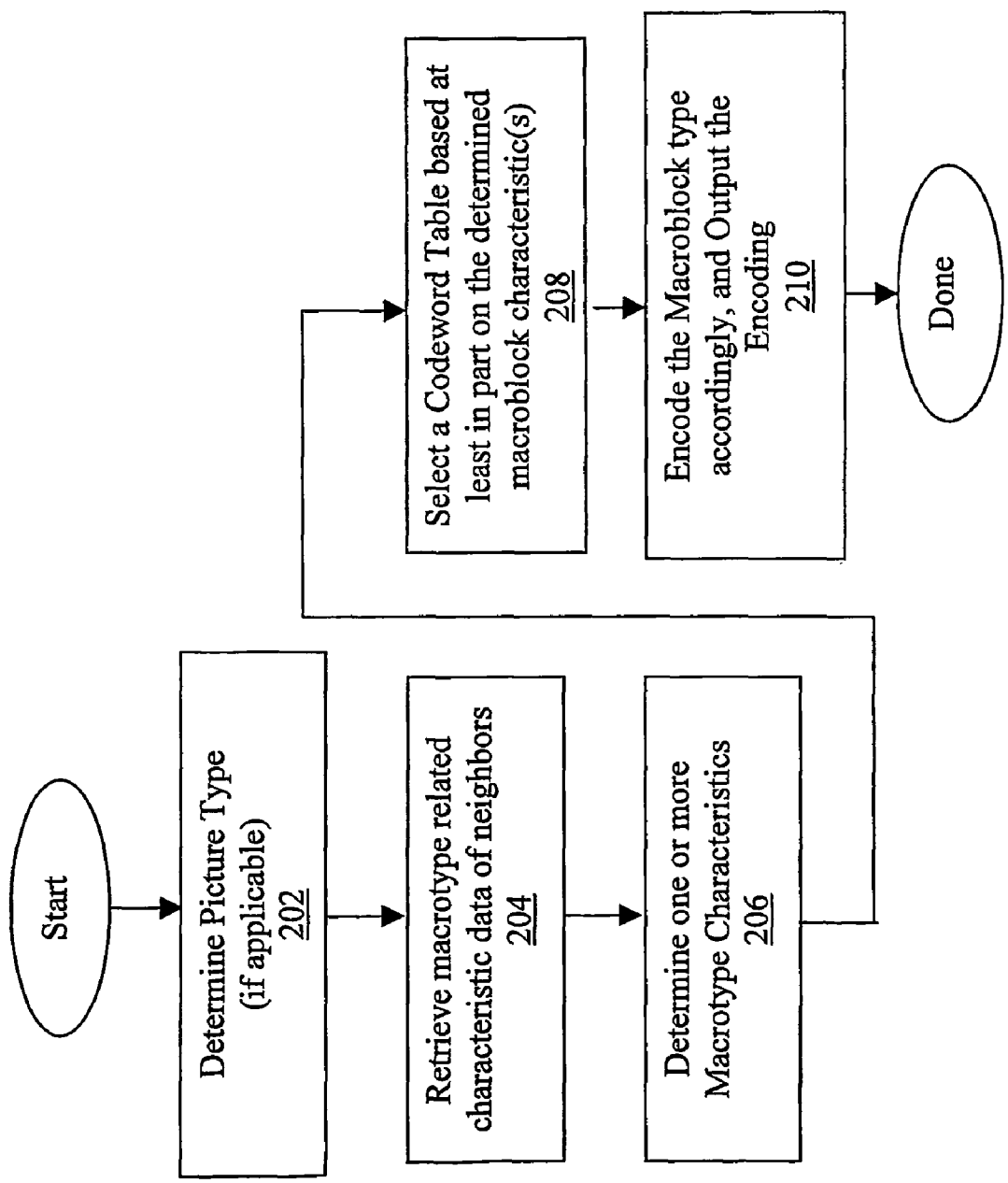
FIG. 2 illustrates the operational flow of the relevant aspects of the encoder block of FIG. 1 for encoding macroblock types of macroblocks of a picture, in accordance with one embodiment.

FIG. 2 illustrates the operational flow of the relevant aspects of coding logic/writer 104 of FIG. 1 for adaptively encoding macroblock types of macroblocks of a picture, in accordance with one embodiment. As illustrated, for the embodiment, at block 202, on receipt of a macroblock type, coding logic/writer 104 may first determine a picture type of a picture, if appropriate. Typically, the determination is performed once per picture. The determination may e.g. involve examining a picture type indicator in one or more of the leading data bits of a picture. The macroblock type may be received in stream as illustrated in FIG. 1 or also retrieved from buffer 106 after it has been received and stored.

At block 204, coding logic/writer 104 obtains macroblock type related characteristic data of neighboring macroblocks of interest. In one embodiment, coding logic/writer 104 retrieves from macroblock type buffer 106 the macroblock types of up to 4 macroblocks of interest as earlier described.

At block 206, coding logic/writer 104 determines at least one macroblock type characteristic of the neighboring macroblocks of interest. In one embodiment, coding logic/writer 104 determines the most common macroblock type among the neighboring macroblocks of interest (employing one or more tie breaking rules, such as a precedence rule, if necessary).

At block 208, coding logic/writer 104 selects one of the codeword tables 102 based at least in part on the one or more determined macroblock type characteristics of the neighboring macroblocks of interest. In various embodiments, the selection is further based on the picture type of the picture of which the macroblock (which macroblock type is to be encoded) is a member.

At block 210, coding logic/writer 104 encodes the macroblock type of the macroblock accordingly, using an appropriate one of the codewords of the selected codeword table, and outputs the encoding, i.e. the VLC codeword (in embodiments where VLC codewords are used).

Referring back to FIG. 1, except for codeword table 102, novel employment of buffer 106 to track macroblock types of neighboring macroblocks of interest, and the employment of these elements by coding logic/writer 104 to adaptively select an appropriate codeword table 102 to encode a macroblock type of a macroblock of a picture, other aspects of encoder 100 are known, and therefore, not illustrated nor described.

In various embodiments, encoder 100 including codeword table 102, coding logic/writer 104, and macroblock type buffer 106 may be implemented in hardware, e.g. via application specific integrated circuit (ASIC), or in software, e.g. in programming languages such as C, or a combination of both.

In various embodiments, coding logic/writer 104 also generates an encoding (DQUANT) indicating whether quantization parameters of the macroblocks have changed. In various embodiments, DQUANT is also looked up from the same codeword table 102 selected to encode a macroblock type of the macroblock.

In one implementation of the earlier described codeword table designed for use to encode macroblock types of macroblocks of a picture having seven possible macroblock types, the codeword tables 102 may further include the following DQUANT codewords, one each for the corresponding seven codeword tables:

| MB type | Table 1 MC = Type A1 | Table 2 MC = Type B1 | Table 3 MC = Type C1 | Table 4 MC = Type D1 |
|---|---|---|---|---|
| DQUANT | 0000000 | 0000000 | 01100 | 100000 |

| MB Type | Table 5 MC = Type E1 | Table 6 MC = Type F1 | Table 7 MC = Type G1 |
|---|---|---|---|
| DQUANT | 0000000 | 0000000 | 0000000 | where MC=Most Common Macroblock Type of the neighboring macroblocks of interest.

In another implementation of the earlier described codeword table designed for use to encode macroblock types of macroblocks of a picture having six possible macroblock types, the codeword tables 102 may further include the following DQUANT codewords, one each for the corresponding six codeword tables:

| MB Type | Table 1 MC = Type A2 | Table 2 MC = Type B2 | Table 3 MC = Type C2 |
|---|---|---|---|
| DQUANT | 10000 | 000000 | 000000 |

| MB Type | Table 4 MC = Type D | Table 5 MC = Type E | Table 6 MC = Type F |
|---|---|---|---|
| DQUANT | 01000 | 000000 | 000000 | where MC also equals "Most Common Macroblock Type" of the neighboring macroblocks of interest.

Decoder

Figure 4:
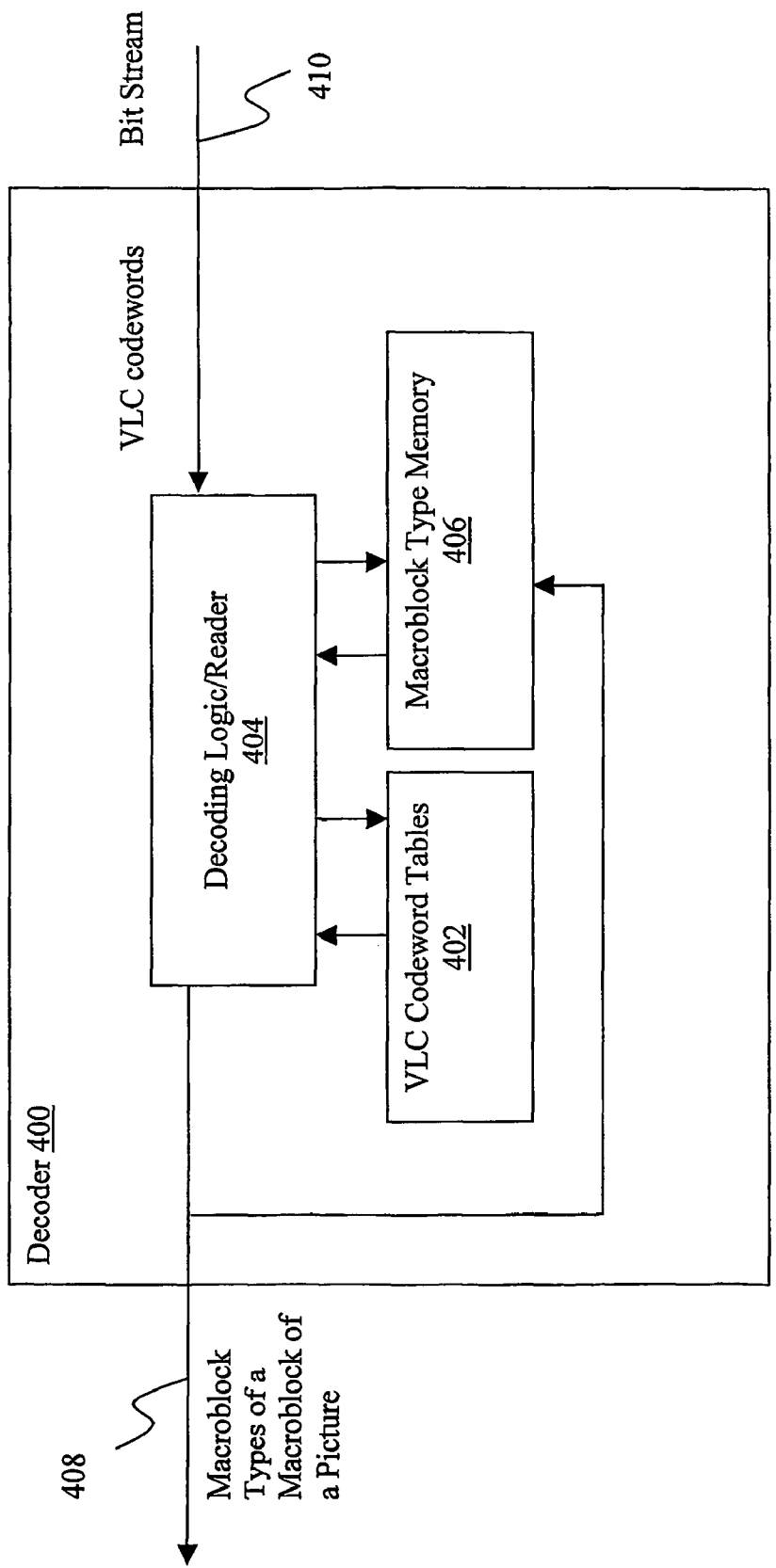
FIG. 4 illustrates an overview of a context-adaptive decoder of the present invention for decoding macroblock types encodings generated in accordance with principles similar to those practiced by the encoder of FIG. 1, in accordance with one embodiment.

FIG. 4 illustrates an overview of a context-adaptive decoder of the present invention for decoding macroblock type encodings generated as earlier described, in accordance with one embodiment. As illustrated, for the embodiment, context-adaptive decoder 400 is similarly constituted as encoder 100, having codeword tables 402, decoding logic/reader 404 and macroblock type buffer 406 coupled to each other and to input 410 as shown, to receive a bit stream comprising macroblock types encoded in codewords generated in accordance with the same principles as earlier described. In response, for each received macroblock type encoding, decoding logic/reader 404 using one or more macroblock types of one or more macroblocks neighbor to the macroblock to select one of codeword tables 402, and decodes the macroblock type encoding, in accordance with the selected one of codeword tables 402. Decoding logic/reader 404 further outputs the decoded macroblock type into a bit stream at output 110.

In other words, macroblock type buffer 406 is employed to store at least the decoded macroblock types of the neighboring macroblocks of interest. In one embodiment, buffer 406 has sufficient capacity to store the decoded macroblock types of all macroblocks of a picture, and for each macroblock type of a macroblock to be decoded, decoding logic/reader 404 reads out only the decoded macroblock type of the macroblocks of interest.

The selection of an appropriate one of codeword tables 402 for use in the decoding of a macroblock type encoding is complementary to the manner an appropriate one of codeword tables 102 is selected for use in encoding. That is, an appropriate one of codeword tables 402 is selected based at least in part on one or more macroblock type related attribute of the neighboring macroblocks of interest, if the appropriate one of codeword tables 102 is so selected.

In particular, selection of an appropriate one of codeword tables 402 is based at least in part on the most common macroblock type of the neighboring macroblocks of interest, if selection of an appropriate one of codeword tables 102 is so based. One or more tie breaking rules corresponding to the ones used during encoding may be used during decoding.

Selection of an appropriate one of codeword tables 402 is further based on the picture type of the picture of which the macroblock is a member, if selection of an appropriate one of codeword tables 102 is so further based.

The neighboring macroblocks of interest are those illustrated in FIG. 3*b*, if they are the neighboring macroblocks of interest during encoding. The codeword tables employed for pictures of different picture types are the tables earlier described, if they are the tables employed for encoding.

Figure 5:
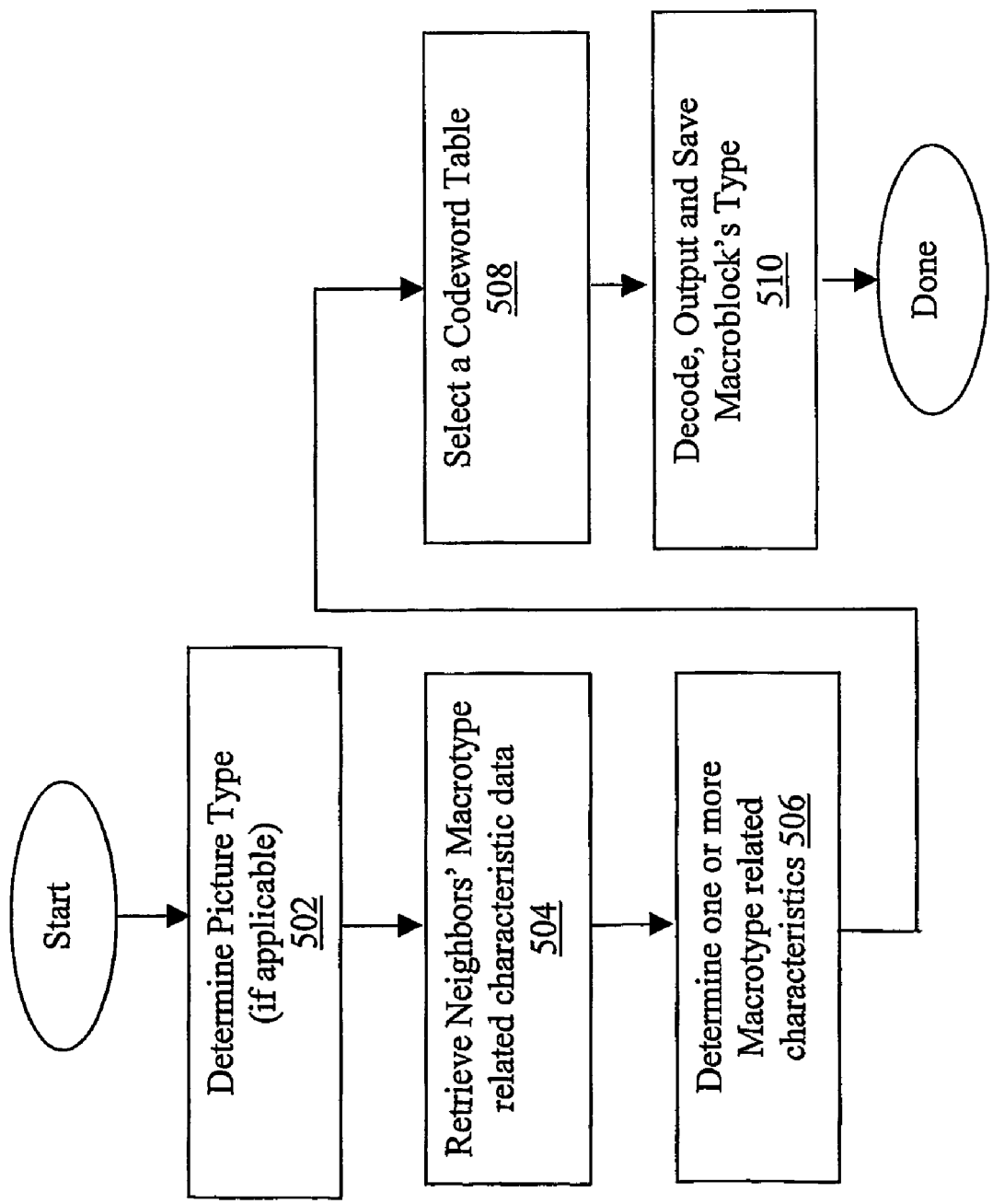
FIG. 5 illustrates the operational flow of the relevant aspects of the decoder block of FIG. 4 for decoding adaptively generated macroblock type encodings of macroblocks of a picture, in accordance with one embodiment.

FIG. 5 illustrates the operational flow of the relevant aspects of decoding logic/reader 404 of FIG. 4 for adaptively decoding encoded macroblock types of macroblocks of a picture, in accordance with one embodiment. As illustrated, for the embodiment, at block 502, on receipt of a macroblock type encoding, decoding logic/reader 404 may first determine a picture type of a picture, if appropriate. Typically, the determination is performed once per picture. The determination may e.g. involve examining a picture type indicator in one or more of the leading data bits of a picture.

At block 504, decoding logic/reader 404 obtains macroblock type related characteristic data of neighboring macroblocks of interest. In one embodiment, decoding logic/reader 404 retrieves from macroblock type buffer 406 the macroblock types of up to 4 macroblocks of interest as earlier described.

At block 506, decoding logic/reader 404 determines at least one macroblock type characteristic of the neighboring macroblocks of interest. In one embodiment, decoding logic/reader 404 determines the most common macroblock type among the neighboring macroblocks of interest (employing a tie breaking rule if necessary).

At block 508, decoding logic/reader 404 selects one of the codeword tables 102 based at least in part on the one or more determined macroblock type characteristics of the neighboring macroblocks of interest. In various embodiments, the selection is further based on the picture type of the picture of which the macroblock is a member.

At block 510, decoding logic/reader 404 decodes the encoded macroblock type of the macroblock accordingly, using an appropriate one of the codewords of the selected codeword table, and outputs the decoded macroblock type.

Referring back to FIG. 4, except for codeword table 402, novel employment of buffer 406 to track macroblock types of neighboring macroblocks of interest, and the employment of these elements by decoding logic/writer 404 to adaptively select an appropriate codeword table 402 to decode a macroblock type encoding for a macroblock of a picture, other aspects of decoder 400 are known, and therefore, not illustrated nor described.

In various embodiments, decoder 400 including codeword table 402, decoding logic/reader 404, and macroblock type buffer 406 may be similarly implemented in hardware, e.g. via application specific integrated circuit (ASIC), or in software, e.g. in programming languages such as C, or a combination of both.

In various embodiments, coding logic/reader 404 accommodates the presence of an encoding (DQUANT) intermixed among the macroblock type encodings, with DQUANT, as earlier described, indicating whether quantization parameters of the macroblocks have changed.

In various embodiments, the encoding to be recognized is also looked up from the same codeword table 102 selected to decode a macroblock type of the macroblock.

In one implementation of the earlier described codeword tables designed for use to encode macroblock types of macroblocks of a picture having seven or six possible macroblock types, the codeword tables 102 may further include the DQUANT codewords, one each for the corresponding codeword tables, as set forth above.

Example Applications of the Present Invention

Figure 6:
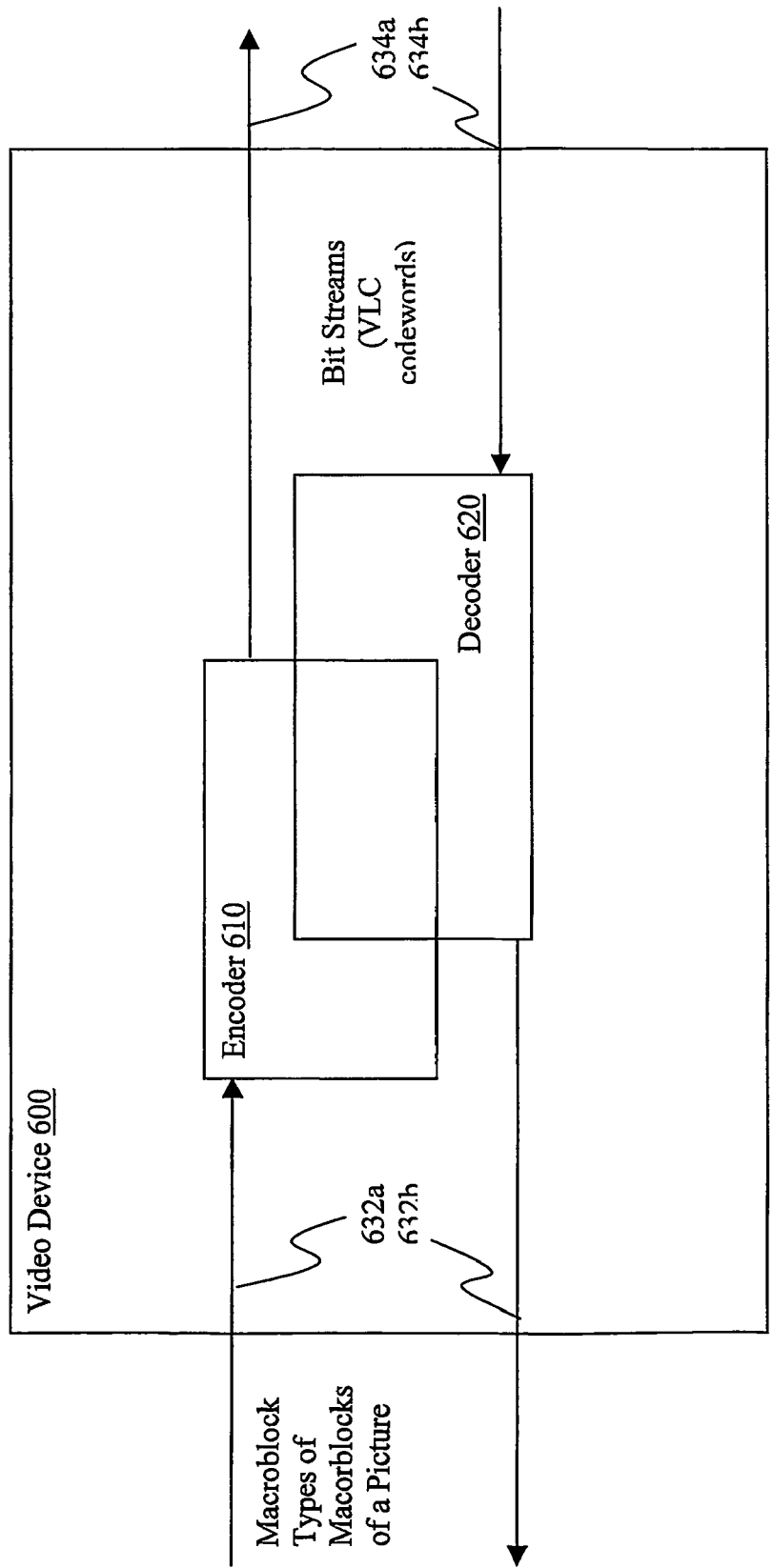
FIG. 6 illustrates a video device having an encoder and a decoder incorporated with the encoding/decoding teachings of the present invention, in accordance with one embodiment.

FIG. 6 illustrates a video device incorporated with the teachings of the present invention, in accordance with one embodiment. As illustrated, video device 600 includes encoder 610 and decoder 620 coupled to the inputs and outputs of the device. As described earlier, encoder 610 is designed to receive macroblock types of macroblocks of pictures of a video, and to adaptively encode them in response, into VLC codewords 634*a*. Decoder 620 is designed to receive VLC codewords 634*b* of the macroblock types of macroblocks of pictures of another video, and to adaptively decode in response the codewords back into macroblock types 632*b*.

Encoder 610 and decoder 620 are similarly constituted as the earlier described encoder 100 and decoder 400. In various embodiments, encoder 610 and decoder 620 may share at least in part their constituting tables and coding/decoding logics (as denoted by the intersecting blocks of encoder 610 and decoder 620).

In various embodiments, video device 600 may be a wireless mobile phone, a palm sized computing device, such as a personal digital assistant, a laptop computing device, a desktop computing device, a server, and other computing devices of the like. In other embodiments, video device 600 may be a circuit board component, such as a video "add-on" circuit board (also referred to as a daughter circuit board), a motherboard, and other circuit boards of the like.

In yet other embodiments, instead of having both encoder 610 and decoder 620, video device 600 may include encoder 610 only, as in the case of a video camera, or decoder 620 only, as in the case of a DVD player, a television, a display monitor, or a set-top box.

Figure 7:
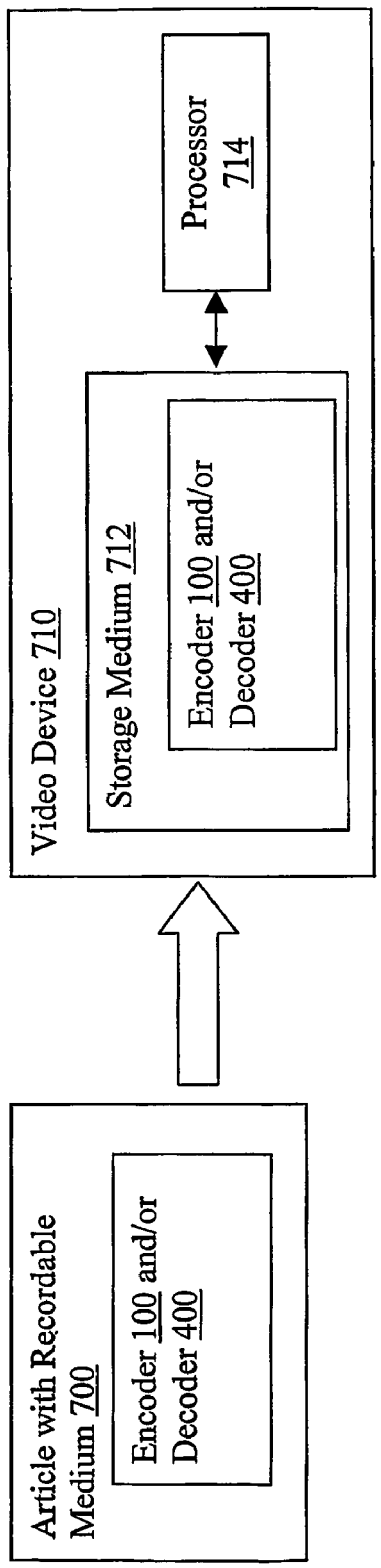
FIG. 7 illustrates an article of manufacture with a recordable medium having a software implementation of the encoder/decoder of the present invention, designed for use to program a device to equip the device with the encoding/decoding capability of the present invention, in accordance with one embodiment.

FIG. 7 illustrates an article of manufacture including a recordable medium 700 having programming instructions implementing a software embodiment of the earlier described encoder 100 and/or decoder 400. The programming instructions are designed for use to program video device 710 to equip video device 710 with the encoding and decoding capabilities of the present invention.

For the embodiment, video device 710 include storage medium 712 to store at least a portion of a working copying of the programming instructions implementing the software embodiment of encoder 100 and/or decoder 400, and at least one processor 714 coupled to storage medium 712 to execute the programming instructions.

Video device 712 may be any one of the earlier enumerated example device devices or other video devices of the like. Article 710 may e.g. be a diskette, a compact disk (CD), a DVD or other computer readable medium of the like. In other embodiments, article 710 may be a distribution server distributing encoder 100 and/or decoder 400 on line, via private and/or public networks, such as the Internet. In one embodiment, article 710 is a web server.

Figure 8:
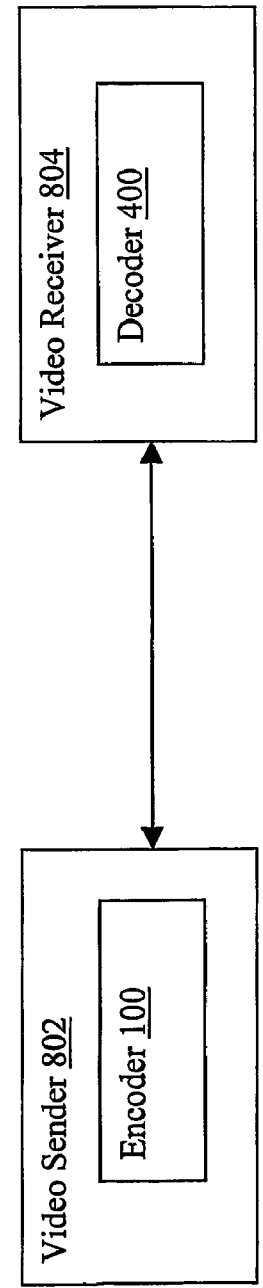
FIG. 8 illustrates a system having a video sender device and a video receiver device incorporated with the encoding/decoding teachings of the present invention, in accordance with one embodiment.

FIG. 8 illustrates an example system having video sender 802 and video receiver 804 communicatively coupled to each other as shown, with video sender 802 encoding a video in accordance with the teachings of the present invention, and providing the encoded video to video receiver 802, and video receiver 802, in turn decoding the encoded video to render the video. Video sender 802 and video receiver 804 are equipped with the earlier described encoder 100 and decoder 400 respectively.

An example of video sender 802 is a video server, whereas an example of a video receiver 804 is a client device coupled to video sender 802.

CONCLUSION AND EPILOGUE

Thus, it can be seen from the above descriptions, a novel method for encoding and decoding macroblock types of macroblocks of a picture, including encoders, decoders, devices and systems incorporated with the method have been described.

While the present invention has been described in terms of the foregoing embodiments and example applications, those skilled in the art will recognize that the invention is not limited to the embodiments and example application described. The present invention can be practiced with modification and alteration within the spirit and scope of the appended claims. For examples, different number of encoder/decoder blocks, different number of codeword tables in the various encoder/decoder blocks, different codeword tables, and different codeword table selection logic.

Thus, the description is to be regarded as illustrative instead of restrictive on the present invention.

What is claimed is:

1. An apparatus comprising:
   storage medium; and
   a plurality of codeword tables stored in said storage medium, with each of said plurality of codeword tables having a plurality of codewords, one of said plurality of codeword tables to be selectively accessed based at least in part on a most common macroblock type of a plurality of neighboring macroblocks of a macroblock of a picture, for performing a selected one of
   encoding a macroblock type of the macroblock of the picture using an appropriate one of the codewords of the selectively accessed codeword table; and
   decoding a macroblock type of a macroblock of the picture using an appropriate one of the codewords of the selectively accessed codeword table.

2. The apparatus of claim 1, wherein the plurality of codeword tables are to be selectively accessed based also on a picture type of the picture.

3. The apparatus of claim 1, wherein the plurality of neighboring macroblocks comprise first one or more macroblocks immediately adjacent to the macroblock.

4. The apparatus of claim 3, wherein the plurality of neighboring macroblocks further comprises second one or more macroblocks immediately adjacent to one of the first one or more macroblocks.

5. The apparatus of claim 1, wherein the plurality of codeword tables comprises at least one of the following codeword tables

| Coded MB type | Most common neighboring macroblock type | | | |
|---|---|---|---|---|
| | Type A | Type B | Type C | Types D |
| Type A | 1 | 001 | 01101 | 1001 |
| Type B | 01 | 1 | 0101 | 10001 |
| Type C | 001 | 01 | 1 | 01 |
| Type D | 000001 | 0000001 | 0100 | 00 |
| Type E | 00001 | 000001 | 001 | 101 |
| Type F | 0001 | 00001 | 000 | 11 |
| Type G | 0000001 | 0001 | 0111 | 100001 |

| Coded MB type | Most common macroblock type | | |
|---|---|---|---|
| | Type E | Type F | Type G |
| Type A | 00001 | 00001 | 000001 |
| Type B | 000001 | 000001 | 001 |
| Type C | 1 | 1 | 01 |
| Type D | 0001 | 0001 | 0000001 |
| Type E | 01 | 001 | 00001 |
| Type F | 001 | 01 | 0001 |
| Type G | 0000001 | 0000001 | 1. |

6. The apparatus of claim 1, wherein the plurality of codeword tables comprises at least one of the following codeword tables

| Coded MB type | Most common macroblock type | | |
|---|---|---|---|
| | Type A | Type B | Type C |
| Type A | 01 | 0001 | 000001 |
| Type B | 101 | 1 | 0001 |
| Type C | 00 | 001 | 1 |
| Type D | 11 | 01 | 01 |
| Type E | 10001 | 000001 | 00001 |
| Type F | 1001 | 00001 | 001 |

| Coded MB type | Most Common macroblock type | | |
|---|---|---|---|
| | Type D | Type E | Type F |
| Type A | 01001 | 000001 | 000001 |
| Type B | 001 | 00001 | 00001 |
| Type C | 000 | 001 | 001 |
| Type D | 1 | 01 | 1 |
| Type E | 0101 | 0001 | 0001 |
| Type F | 011 | 1 | 01. |

7. The apparatus of claim 1, wherein the most common macroblock type comprises a first macroblock type having equal frequency of occurrence among the plurality of neighboring macroblocks, with at least a second macroblock type, but precedence over that of the second macroblock type.

8. The apparatus of claim 1, wherein at least one of the codeword tables further comprises a codeword to encode whether a quantization parameter of the macroblock has changed (DQUANT).

9. The apparatus of claim 8, wherein at least one of the DQUANTs is a selected one of "0000000", "01100", and "100000".

10. The apparatus of claim 8, wherein at least one of the DQUANTs is a selected one of "01000", and "10000".

11. The apparatus of claim 1, wherein the apparatus further comprises logic coupled to the plurality of codeword tables to perform at least one of encoding a macroblock type of a macroblock of a picture; and decoding a macroblock type of a macroblock of a picture.

12. The apparatus of claim 1, wherein the apparatus further comprises a processor coupled to the storage medium to selectively access said codewords of said codeword tables to perform said encoding/decoding.

13. The apparatus of claim 1, wherein the apparatus comprises a selected one of a palm sized computing device, a wireless mobile phone, a digital personal assistant, a laptop computing device, a desktop computing device, a set-top box, a server, a compact disk player, a digital versatile disk player, a television, and a display monitor.

14. The apparatus of claim 1, wherein the apparatus further comprises a video daughter card and a motherboard having integrated video capability.

15. A non-transitory computer-readable storage medium having stored therein instructions comprising:
a plurality of codeword tables to be retrieved to program an apparatus, with each of said plurality of codeword tables having a plurality of codewords, one of said plurality of codeword tables to be selectively accessed, based at least in part on a most common macroblock type of a plurality of neighboring macroblocks of a macroblock of a picture, for performing a selected one of
encoding a macroblock type of the macroblock of the picture using an appropriate one of the codewords of the selectively accessed codeword table; and
decoding a macroblock type of a macroblock of the picture using an appropriate one of the codewords of the selectively accessed codeword table.

16. The computer-readable storage medium of claim 15, wherein the plurality of codeword tables are to be selectively accessed based also on a picture type of the picture.

17. The computer-readable storage medium of claim 15, wherein the plurality of neighboring macroblocks comprise first one or more macroblocks immediately adjacent to the macroblock.

18. The computer-readable storage medium of claim 17, wherein the plurality of neighboring macroblocks further comprises second one or more macroblocks immediately adjacent to one of the first one or more macroblocks.

19. The computer-readable storage medium of claim 15, wherein the plurality of codeword tables comprises at least one of the following codeword tables

| Coded MB type | Most common neighboring macroblock type | | | |
|---|---|---|---|---|
| | Type A | Type B | Type C | Types D |
| Type A | 1 | 001 | 01101 | 1001 |
| Type B | 01 | 1 | 0101 | 10001 |
| Type C | 001 | 01 | 1 | 01 |
| Type D | 000001 | 0000001 | 0100 | 00 |
| Type E | 00001 | 000001 | 001 | 101 |
| Type F | 0001 | 00001 | 000 | 11 |
| Type G | 0000001 | 0001 | 0111 | 100001 |

| Coded MB type | Most common macroblock type | | |
|---|---|---|---|
| | Type E | Type F | Type G |
| Type A | 00001 | 00001 | 000001 |
| Type B | 000001 | 000001 | 001 |
| Type C | 1 | 1 | 01 |
| Type D | 0001 | 0001 | 0000001 |
| Type E | 01 | 001 | 00001 |
| Type F | 001 | 01 | 0001 |
| Type G | 0000001 | 0000001 | 1. |

20. The computer-readable storage medium of claim 15, wherein the plurality of codeword tables comprises at least one of the following codeword tables

| Coded MB type | Most common macroblock type | | |
|---|---|---|---|
| | Type A | Type B | Type C |
| Type A | 01 | 0001 | 000001 |
| Type B | 101 | 1 | 0001 |
| Type C | 00 | 001 | 1 |
| Type D | 11 | 01 | 01 |
| Type E | 10001 | 000001 | 00001 |
| Type F | 1001 | 00001 | 001 |

| Coded MB type | Most Common macroblock type | | |
|---|---|---|---|
| | Type D | Type E | Type F |
| Type A | 01001 | 000001 | 000001 |
| Type B | 001 | 00001 | 00001 |
| Type C | 000 | 001 | 001 |
| Type D | 1 | 01 | 1 |
| Type E | 0101 | 0001 | 0001 |
| Type F | 011 | 1 | 01. |

21. The computer-readable storage medium of claim 15, wherein the most common macroblock type comprises a first macroblock type having equal frequency of occurrence among the plurality of neighboring macroblocks, with a second macroblock type, but precedence over that of the second macroblock type.

22. The computer-readable storage medium of claim 15, wherein at least one of the codeword tables further comprises a codeword to encode whether a quantization parameter of the macroblock has changed (DQUANT).

23. The computer-readable storage medium of claim 15, further comprising programming instructions recorded on the computer-readable medium, designed to utilize the plurality of codeword tables to perform at least one of
encoding a macroblock type of a macroblock of a picture; and
decoding a macroblock type of a macroblock of a picture.

24. A video-device implemented video encoding/decoding method comprising:
determining, by the video device, a most common macroblock type of a plurality of neighboring macroblocks of a macroblock of a picture;
obtaining, by the video device, a plurality of codeword tables, with each of said plurality of codeword tables having a plurality of codewords for encoding macroblock types;
selecting, by the video device, one of said plurality of codeword tables based at least in part on the determined most common macroblock type of the plurality of neighboring macroblocks of the macroblock;
performing, by the video device, computer, a selected one of encoding and decoding of a macroblock type of the macroblock of the picture, using an appropriate one of the codewords of the selected codeword table; and performing, by the video device, a selected one of storing the encoded macroblock type to a bit stream and outputting the picture to a display device.

25. The method of claim 24, wherein the method further comprises determining a picture type of the picture, and said selecting is further based on the determined picture type of the picture.

26. The method of claim 24, wherein the plurality of neighboring macroblocks comprise first one or more macroblocks immediately adjacent to the macroblock.

27. The method of claim 26, wherein the plurality of neighboring macroblocks further comprises second one or more macroblocks immediately adjacent to one of the first one or more macroblocks.

28. The method of claim 24, wherein the plurality of codeword tables comprises at least one of the following codeword tables

| Coded MB | Most common neighboring macroblock type | | | |
|---|---|---|---|---|
| type | Type A | Type B | Type C | Types D |
| Type A | 1 | 001 | 01101 | 1001 |
| Type B | 01 | 1 | 0101 | 10001 |
| Type C | 001 | 01 | 1 | 01 |
| Type D | 000001 | 0000001 | 0100 | 00 |
| Type E | 00001 | 000001 | 001 | 101 |
| Type F | 0001 | 00001 | 000 | 11 |
| Type G | 0000001 | 0001 | 0111 | 100001 |

| Coded MB | Most common macroblock type | | |
|---|---|---|---|
| type | Type E | Type F | Type G |
| Type A | 00001 | 00001 | 000001 |
| Type B | 000001 | 000001 | 001 |
| Type C | 1 | 1 | 01 |
| Type D | 0001 | 0001 | 0000001 |
| Type E | 01 | 001 | 00001 |
| Type F | 001 | 01 | 0001 |
| Type G | 0000001 | 0000001 | 1. |

29. The method of claim 24, wherein the plurality of codeword tables comprises at least one of the following codeword tables

| Coded MB | Most common macroblock type | | |
|---|---|---|---|
| type | Type A | Type B | Type C |
| Type A | 01 | 0001 | 000001 |
| Type B | 101 | 1 | 0001 |
| Type C | 00 | 001 | 1 |
| Type D | 11 | 01 | 01 |
| Type E | 10001 | 000001 | 00001 |
| Type F | 1001 | 00001 | 001 |

| Coded MB | Most Common macroblock type | | |
|---|---|---|---|
| type | Type D | Type E | Type F |
| Type A | 01001 | 000001 | 000001 |
| Type B | 001 | 00001 | 00001 |
| Type C | 000 | 001 | 001 |
| Type D | 1 | 01 | 1 |
| Type E | 0101 | 0001 | 0001 |
| Type F | 011 | 1 | 01. |

30. The method of claim 24, wherein the most common macroblock type comprises a first macroblock type having equal frequency of occurrence among the plurality of neighboring macroblocks, with a second macroblock type, but precedence over that of the second macroblock type.

31. The method of claim 24, wherein at least one of the codeword tables further comprises a codeword to encode whether a quantization parameter of the macroblock has changed (DQUANT).

32. The method of claim 31, wherein at least one of the DQUANTs is a selected one of "0000000", "01100", and "100000".

33. The method of claim 31, wherein at least one of the DQUANTs is a selected one of "01000", and "10000".

* * * * *